United States Patent
Chen

(10) Patent No.: US 8,961,730 B2
(45) Date of Patent: Feb. 24, 2015

(54) LCD DEVICE, MANUFACTURING METHOD AND EQUIPMENT FOR LCD PANEL

(75) Inventor: Cheng-hung Chen, Guandong (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 167 days.

(21) Appl. No.: 13/581,307

(22) PCT Filed: Jun. 29, 2012

(86) PCT No.: PCT/CN2012/077818
§ 371 (c)(1),
(2), (4) Date: Aug. 25, 2012

(87) PCT Pub. No.: WO2014/000239
PCT Pub. Date: Jan. 3, 2014

(65) Prior Publication Data
US 2013/0340934 A1      Dec. 26, 2013

(30) Foreign Application Priority Data
Jun. 26, 2012   (CN) .......................... 2012 1 0213638

(51) Int. Cl.
*B32B 37/12*    (2006.01)
(52) U.S. Cl.
USPC ...................................... 156/272.2

(58) Field of Classification Search
CPC .............................. B32B 37/12; G02F 1/1339
USPC ...................................... 156/272.2, 275.5, 60
See application file for complete search history.

(56) References Cited

U.S. PATENT DOCUMENTS

| | | | |
|---|---|---|---|
| 6,122,033 A * | 9/2000 | Mathew et al. | 349/155 |
| 6,740,190 B2 * | 5/2004 | Takase | 156/267 |
| 2003/0223030 A1 * | 12/2003 | Byun et al. | 349/187 |

* cited by examiner

*Primary Examiner* — Daniel McNally
(74) *Attorney, Agent, or Firm* — Andrew C. Cheng

(57) ABSTRACT

The present invention provides a manufacturing method for LCD panel by coating the first sealant having electrical conductibility on the PSVA testing pad of the lower substrate or on the position of the upper substrate corresponding to the PSVA testing pad of the lower substrate such that the PSVA testing pad electrically connects to the transparent electrode through the first sealant.
The present invention also provides a manufacturing method for the LCD device and a manufacturing equipment for the LCD panel. By the above ways, the present invention can improve the uneven phenomenon around the screen of the active viewing area of LCD panel and reduce the occurrence of broken bright spot and realize narrow frame design of the LCD panel.

9 Claims, 4 Drawing Sheets

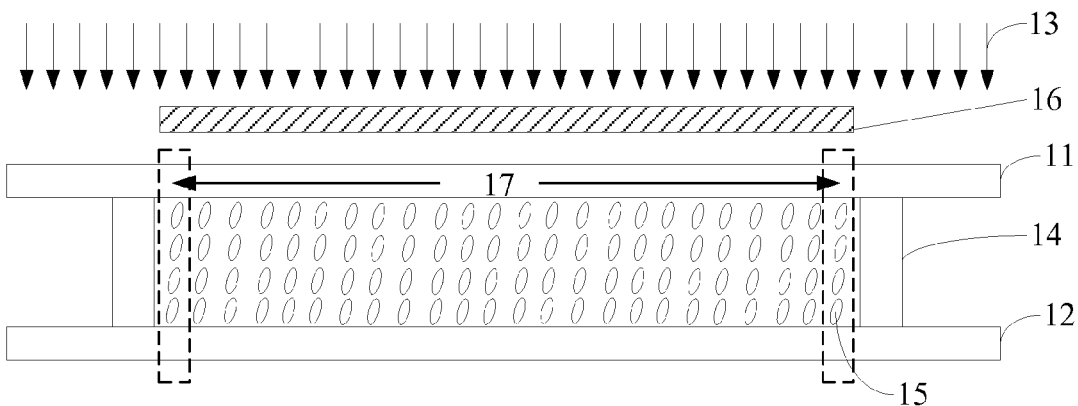

Fig.1 (prior art)

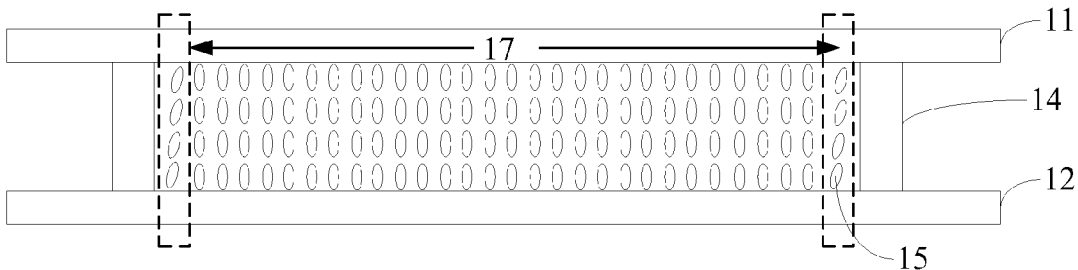

Fig.2 (prior art)

--- coating a first sealant having electrical conductibility on a PSVA testing pad of the lower substrate of an LCD panel, or coating a first sealant having electrical conductibility on a position of the upper substrate of an LCD panel corresponding to a PSVA testing pad of the lower substrate of the LCD panel, and adhering the upper and lower substrate through a second sealant to form an assembled panel such that the PSVA testing pad electrically connects to a transparent electrode of the upper substrate through the first sealant, and the second sealant is located at the inner region of the first sealant. — S101

↓ blocking the area surrounded by the second sealant of the assembled panel at one side of the upper substrate or the lower substrate, and exposing the assembled panel to cure the second sealant. — S102

Fig.3

LCD DEVICE, MANUFACTURING METHOD AND EQUIPMENT FOR LCD PANEL

BACKGROUND OF THE INVENTION

1. Field of the Invention

The present invention relates to the field of LCD technology. More particularly, relates to a liquid crystal display (LCD) device, manufacturing method and equipment for an LCD panel.

2. Description of Related Art

PSVA (Polymer Stabilization Vertical Alignment) wide viewing angle technology enables the LCD panel to have a good black state, faster response time, and transmittance advantages. The PSVA type LCD panel, comparing to traditional LCD panel display, better to give users a higher level of visual experience, has gradually become the mainstream of development direction of the LCD panel.

In PSVA manufacturing process, PSVA type LCD panel usually mixes light-sensitive monomer (Monomer) with the liquid crystal molecules between the upper and lower substrates or with the alignment film (PI. Polyimide) such that the monomer molecules condenses to the surface of the alignment film by UV irradiation or heating. Therefore, the liquid crystal molecules have pretilt angle.

Before PSVA process, the LCD panel needs a SUV (Sealant Ultra-Violet) curing process. In this process, with reference to FIG. 1, the upper substrate 11 and the lower substrate 12 adhesive together through the sealant 14 to form an assembled panel. After adhesion, it requires to use UV (Ultra-Violet) ray 13 to expose the sealant 14 so as to cure the sealant 14. In the sealant 14 curing process by using UV ray 13 to expose the sealant 14, it requires a UV ray mask 16 to block the UV ray 13 to avoid the monomer molecule (not shown) mixed with the liquid crystal molecules 15 in the active viewing area from early reaction before the PSVA process. It is also known as a pre-cured action.

The UV ray mask 16 could block the exposure of the UV ray at the active viewing area 17. However, it cannot avoid the action of the oblique light, and the influence of the making precision and positioning error of the UV ray mask 16. The UV ray 13 still could expose the liquid crystal molecules 15 near the boundary of the active viewing area 17.

A capacitor is formed between the upper substrate 11 and the lower substrate 12 such that it exists an electric field between the upper and lower substrates. The electric field forces the liquid crystal molecules 15 to occur certain deflection. When the UV ray 13 exposes the liquid crystal molecules 15 near the boundary of the active viewing area 17, the liquid crystal molecules 15 near the boundary of the active viewing area 17 are cured at a pretitle state because of early reaction. Therefore, the liquid crystal molecules 15 near the boundary of the active viewing area 17 cannot be vertical to the surface of alignment film such that they are different from most of the other liquid crystal molecules in the active viewing area 17 (as shown in FIG. 2). The boundary around the active viewing area 17 forms uneven screen or broken bright spot phenomenon, and will occur around Mura in the follow-up the stage. At this time, the UV ray mask 16 have to extend its edge with a distance to cover the boundary of the active viewing area 17 such that the liquid crystal molecules 15 near the boundary of the active viewing area 17 will not be exposed by the UV ray. However, that distance is unfavorable for narrow frame design of the LCD panel.

SUMMARY OF THE INVENTION

The main technical problems solved by the present invention are providing an LCD device, a manufacturing method for an LCD panel and a manufacturing equipment for an LCD panel to improve the uneven phenomenon around the screen of the active viewing area of the LCD panel and to reduce the occurrence of broken bright spot and to be easier to realize narrow frame design of the LCD panel.

To solve the above technical problems, a technical solution is providing a manufacturing method for an LCD panel comprising:

coating a first sealant having electrical conductivity on a PSVA (Polymer Stabilization Vertical Alignment) testing pad of a lower substrate of the LCD panel, or coating a first sealant having electrical conductivity on a position of an upper substrate of the LCD panel corresponding to a PSVA testing pad of the lower substrate, and adhering the upper and the lower substrate through a second sealant to form an assembled panel such that the PSVA testing pad electrically connects to a transparent electrode of the upper substrate through the first sealant, and the second sealant is located at the inner region of the first sealant;

blocking the area surrounded by the second sealant of the assembled panel at one side of the upper substrate or the lower substrate, and exposing the assembled panel to cure the second sealant; and removing the part of the upper substrate corresponding to the PSVA testing pad of the lower substrate and also the first sealant to reveal the PSVA testing pad of the lower substrate.

Wherein, the step of coating the first sealant having electrical conductivity is specifically coating the first sealant having electric conductive particles.

Wherein, the step of coating the first sealant having electrical conductivity is specifically coating the first sealant having a non-curing property.

Wherein, the step of coating the first sealant having electrical conductivity is specifically coating the first sealant having electrical conductivity and a smaller first adhesion force, wherein, the second sealant has a second adhesion force, and the first adhesive force is smaller than the second adhesive force.

To solve the above technical problems, another technical solution is providing a manufacturing method for an LCD device, wherein, comprising a manufacturing method for an LCD panel, the manufacturing method for the LCD panel comprising:

coating a first sealant having electrical conductivity on a PSVA testing pad of a lower substrate of the LCD panel, or coating a first sealant having electrical conductivity on a position of an upper substrate of the LCD panel corresponding to a PSVA testing pad of the lower substrate, and adhering the upper and the lower substrate through a second sealant to form an assembled panel such that the PSVA testing pad electrically connects to a transparent electrode of the upper substrate through the first sealant, and the second sealant is located at the inner region of the first sealant; and blocking the area surrounded by the second sealant of the assembled panel at one side of the upper substrate or the lower substrate, and exposing the assembled panel to cure the second sealant.

Wherein, the step of coating the first sealant having electrical conductivity is specifically coating the first sealant having electric conductive particles.

Wherein, the step of coating the first sealant having electrical conductivity is specifically coating the first sealant having a non-curing property.

Wherein, the step of coating the first sealant having electrical conductivity is specifically coating the first sealant having electrical conductivity and a smaller first adhesion force, wherein, the second sealant has a second adhesion force, and the first adhesive force is smaller than the second adhesive force.

Wherein, after the step of exposing the assembled panel to cure the second sealant, comprising:

removing the part of the upper substrate corresponding to the PSVA testing pad of the lower substrate and also the first sealant to reveal the PSVA testing pad of the lower substrate.

Wherein, the step of exposing the assembled panel to cure the second sealant is specifically irradiating the assembled panel by UV ray to cure the second sealant.

To solve the above technical problems, another technical solution is providing a manufacturing equipment for an LCD panel comprising:

a sealant coating mechanism for coating a first sealant having electrical conductibility on an upper substrate or a lower substrate of the LCD panel, and coating a second sealant on the upper substrate or the lower substrate such that the upper and the lower substrate adhere together to form an assembled panel through the second sealant and a PSVA testing pad of the lower substrate electrically connects to a transparent electrode of the upper substrate through the first sealant;

a shading mechanism for blocking the area surrounded by the second sealant of the assembled panel at one side of the upper substrate or the lower substrate so as to prevent irradiating the area surrounded by the second sealant by the UV ray; and a curing mechanism for exposing the second sealant of the assembled panel to cure the second sealant.

Wherein, the sealant coating mechanism comprises:

a first coating mechanism for coating the first sealant having electrical conductibility on the PSVA testing pad of the lower substrate or coating the first sealant having electrical conductibility on the position of the upper substrate corresponding to the PSVA testing pad of the lower substrate such that the PSVA testing pad of the lower substrate electrically connects to a transparent electrode of the upper substrate through the first sealant in assembly process; and a second coating mechanism for coating the second sealant on the edge of the upper substrate or the lower substrate to adhere the upper substrate and the lower substrate through the second sealant to form the assembled panel, and the second sealant is located at the inner region of the first sealant.

Wherein, the equipment comprises:

a cutting mechanism for removing the part of the upper substrate corresponding to the PSVA testing pad of the lower substrate and also the first sealant to reveal the PSVA testing pad of the lower substrate.

The beneficial effects of the present invention are: the present invention has an electric conductive channel between the PVSA testing pad of the lower substrate and the transparent electrode of the upper substrate by using the first sealant such that the lower substrate and the upper substrate have equal voltage before PSVA manufacturing process in order to improve the uneven phenomenon around the screen of the active viewing area of LCD panel and to reduce the occurrence of broken bright spot and to be easier to realize narrow frame design of the LCD panel.

BRIEF DESCRIPTION OF THE DRAWINGS

FIG. 1 is a schematic drawing of an LCD panel with UV curing process for sealant of the conventional art;

FIG. 2 is a schematic drawing of the pretilt state of the liquid crystal molecules of the active viewing area after the UV curing process and before PSVA process in FIG. 1;

FIG. 3 is a flow chart of a manufacturing method for the LCD panel of the present invention;

DETAILED DESCRIPTION OF THE PREFERRED EMBODIMENT

The manufacturing method for the LCD panel of the present invention can improve the uneven phenomenon around the screen of the active viewing area of LCD panel and to reduce the occurrence of broken bright spot and to be easier to realize narrow frame design of the LCD panel.

The following combines drawings and embodiments for detail description of the present invention.

Please refer to FIG. 3, a flow chart of a manufacturing method for the LCD panel of the present invention, including the steps:

Step S101: coating a first sealant having electrical conductibility on a PSVA testing pad of the lower substrate of an LCD panel, or coating a first sealant having electrical conductibility on a position of the upper substrate of an LCD panel corresponding to a PSVA testing pad of the lower substrate of the LCD panel, and adhering the upper and lower substrate through a second sealant to form an assembled panel such that the PSVA testing pad electrically connects to a transparent electrode of the upper substrate through the first sealant, and the second sealant is located at the inner region of the first sealant.

Figure 4:
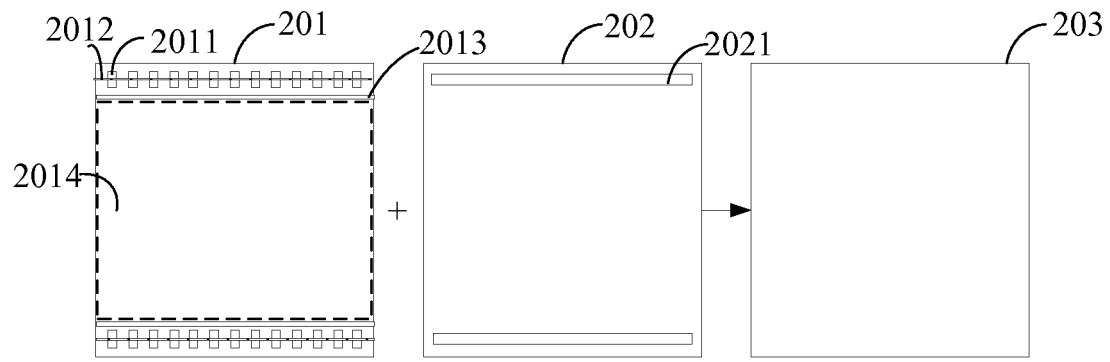
FIG. 4 is the schematic drawing of coating a first sealant having electrical conductibility on PSVA testing pad of the lower substrate in FIG. 3.

In manufacturing process of the PSVA type of the LCD panel, as shown in FIG. 4, disposing the PSVA testing pad 2011 at the edge of the lower substrate 201 so as to apply voltage to the PSVA testing pad 2011 in the subsequent PSVA manufacturing process. And coating the first sealant 2012 having electrical conductibility on the PSVA testing pad by coating tools. The first sealant 2012 is made of special sealant material. In one application example, the sealant comprises electric conductive particles causing the sealant to have electrical conductibility.

The present invention achieves the technical effect by using the electrical conductibility of the first sealant 2012. In this embodiment, the first sealant 2012 also has a non-curing property, it will not be cured by light irradiation or heating.

Figure 5:
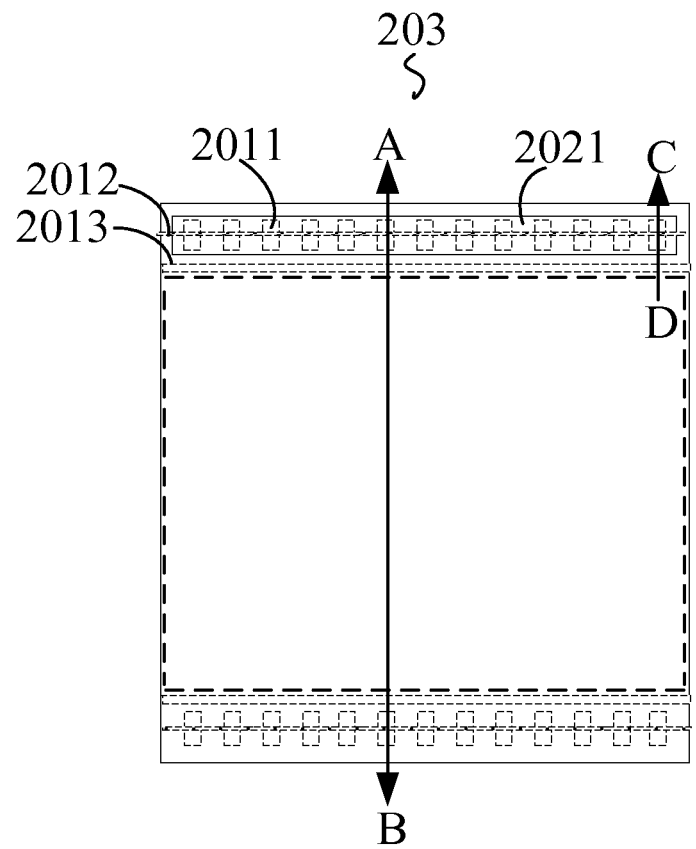
FIG. 5 is an enlarge schematic drawing of the assembled panel in FIG. 4.

After coating the first sealant having electrical conductibility on a PSVA testing pad 2011 of the lower substrate 201, coating a second sealant 2013 at the boundary of the active viewing area 2014 of the lower substrate 201 and at the inner region of the first sealant 2012. Then, it adhere the upper substrate 202 and lower substrate 201 through the second sealant 2013 to form the assembled panel 203 (as shown in FIG. 5).

Wherein, the second sealant 2013 has a better adhesion to firmly adhere the upper substrate 202 and lower substrate 201 together.

The first sealant 2012 has electrical conductibility such that when it adhere the upper substrate 202 and lower substrate 201 through the second sealant 2013 to form the assembled panel 203, the PSVA testing pad 2011 of the lower substrate 201 can electrically connects to the transparent electrode 2021 of the upper substrate 202 through the first sealant 2012.

Figure 6:
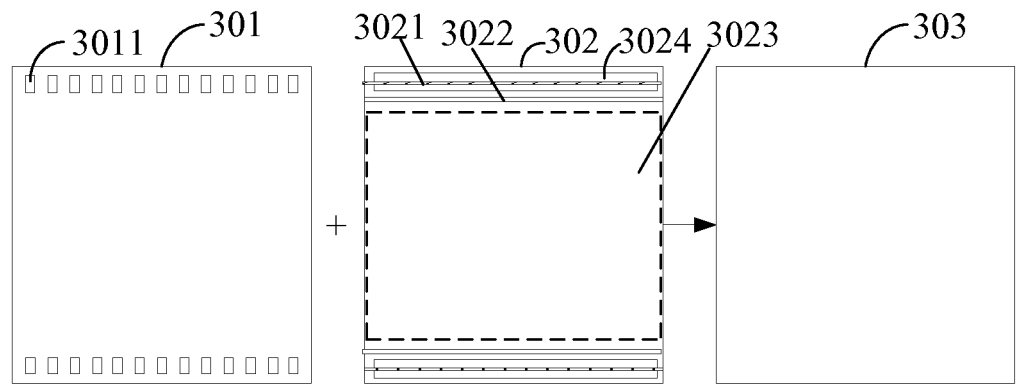
FIG. 6 is a schematic drawing of coating a first sealant having electrical conductibility on the upper substrate corresponding to the PSVA testing pad of the lower substrate in FIG. 3.

Of course, as shown in FIG. 6, in another embodiment, it can also coat a first sealant 3021 having electrical conductibility on a position of an upper substrate 302 of an LCD panel corresponding to the PSVA testing pad 3011 of a lower substrate 301 of the LCD panel. And a transparent electrode 3024 of the upper substrate 302 is also disposed on that position. The first sealant 3021 electrically connects to the transparent electrode 3024. The second sealant 3022 can be coated on the boundary of the active viewing area 3023 of the upper substrate 302. And the second sealant 3022 is located at the inner region of the first sealant 3021.

When adhering the upper substrate 302 and lower substrate 301 through the second sealant 3022 to form the assembled panel 303, the PSVA testing pad 3011 of the lower substrate 301 can electrically connect to the transparent electrode 3024 of the upper substrate 302 through the first sealant 3021.

Step S102: blocking the area surrounded by the second sealant of the assembled panel at one side of the upper substrate or the lower substrate, and exposing the assembled panel to cure the second sealant.

Figure 7:
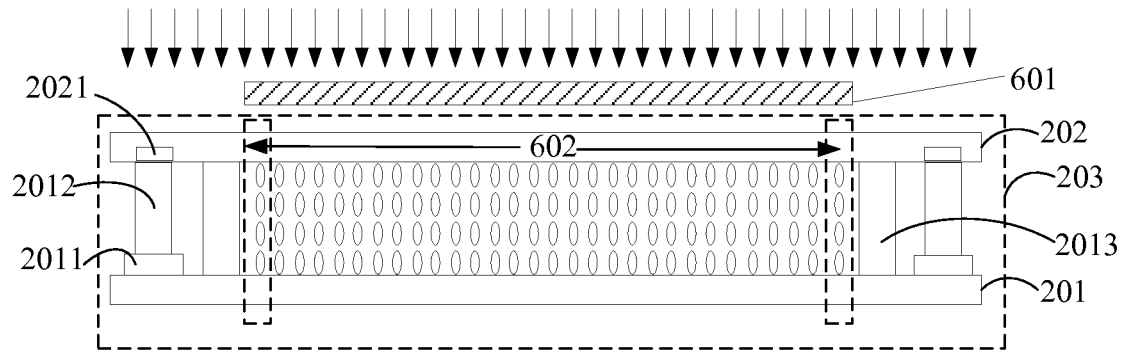
FIG. 7 is a cross-sectional drawing along A-B direction of assembled panel in FIG. 5, and shows the effect of UV irradiation.

As shown in FIG. 7, and combining with FIG. 5, FIG. 7 is a cross-sectional drawing along A-B direction of assembled panel in FIG. 5.

After forming the assembled panel 203, it enters the manufacturing process for curing the sealant of the LCD panel by UV ray.

The second sealant 2013 is sensitive to the light; it can be cured by light irradiation. Therefore, irradiating the assembled panel 203 by UV ray to cure the second sealant 2013. And after irradiating the assembled panel 203 by UV ray to cure the second sealant 2013, heating the assembled panel 203 to further cure the second sealant 2013. Before irradiating the assembled panel 203 by UV ray, using anti-UV mask 601 at one side of upper substrate 202 to block the area surrounded by the second sealant 2013 of the assembled panel 203, that is, the active viewing area 602 to prevent the monomer molecules (not shown) in the active viewing area 602 from irradiating by the UV ray in the UV curing process such that the monomer molecules (not shown) are reacted before PSVA manufacturing process.

It is worth noting that, for convenient and facilitates the reunification of operation, in another embodiment, the first sealant 2012 can use the same material as the second sealant 2013 such that they have the same curing property. When facing light irradiation, the first sealant 2012 is also cured. In this situation, when irradiating UV ray in operating the UV curing process for the sealant, it should also use the anti-UV mask 601 to block the first sealant 2012 to prevent the cured first sealant 2012 from removing hard.

Figure 9:
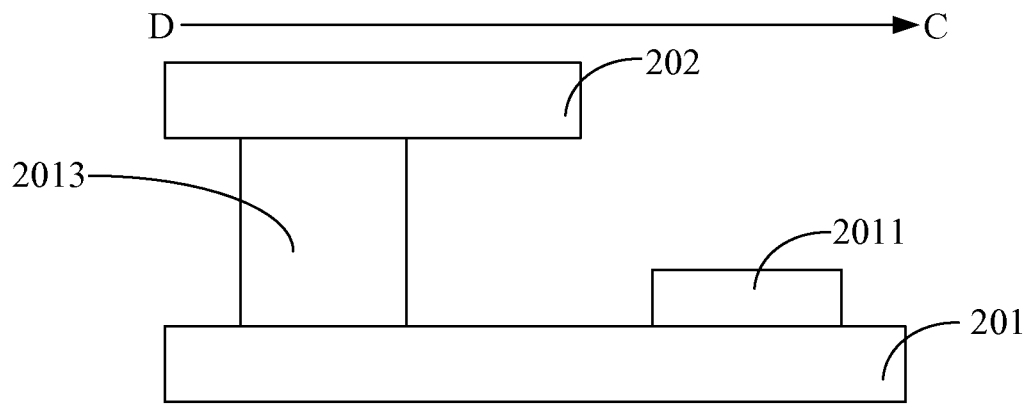
FIG. 9 is a schematic cross section view of the assembled panel in FIG. 5 with removing the part of the upper substrate corresponding to the PSVA testing pad of lower substrate and the first sealant along DC direction.

After curing the second sealant 2013, as shown in FIG. 9, removing the part of the upper substrate 202 corresponding to the PSVA testing pad 2011 of the lower substrate 201 and also the first sealant 2012 to reveal the PSVA testing pad 2011 of the lower substrate 201 to create the conditions for subsequent PSVA process. In addition, the second sealant 2013 can have a larger second adhesion force in order to improve the adhesion tightness of the upper and lower substrate. The first sealant 2012 has a smaller first adhesion force. The first adhesive force is smaller than the second adhesive force such that the first adhesion force does not affect the step of removing the part of the upper substrate 202 corresponding PSVA testing pad 2011 and it is also easier to remove the first sealant 2012.

In this embodiment, the PSVA testing pad 2011 of the lower substrate 201 can electrically connect to the transparent electrode 2021 of the upper substrate 202 through the first sealant 2012 having electrical conductibility such that the lower substrate 201 and the upper substrate 202 have equal voltage before the PSVA manufacturing process, that is, no voltage difference. Therefore, the liquid crystal molecules between the upper and the lower substrate are naturally vertical to the alignment film (not shown) surface, not occurring a deflection angle.

Figure 8:
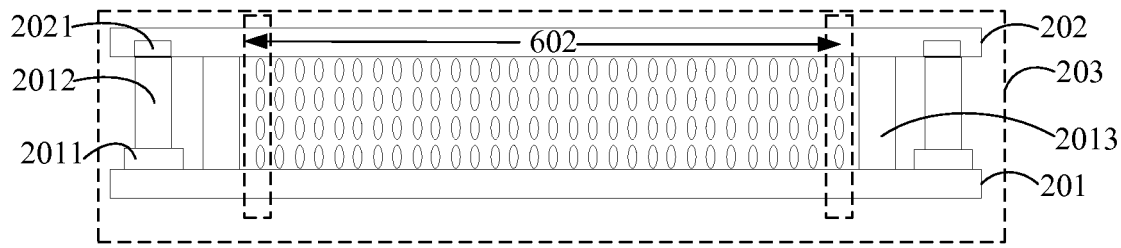
FIG. 8 is a schematic drawing of the pretilt state of the liquid crystal molecules of the active viewing area after the UV curing process and before PSVA process in FIG. 5.

In this situation, when irradiating the assembled panel 203 by UV ray to cure the second sealant 2013, even UV irradiation to the monomer molecules in the liquid crystal molecules at the boundary of the active viewing area of the assembled panel 203, the monomer molecules react but will not let the liquid crystal molecules form the deflection angle. It make the liquid crystal molecules at the boundary of the active viewing area have the same pretilt state as the most of the liquid crystal molecules at the active viewing area after UV curing process for the sealant and before PSVA process (as shown in FIG. 8). Therefore, the LCD panel of the present invention improves the uneven phenomenon around the screen of the active viewing area of LCD panel and reduces the occurrence of broken bright spot. The edge of the anti-UV mask do not need to extend a farther distance from the boundary of the active viewing area such that the boundary of the active viewing area can be closer to the edge of the anti-UV mask, and can even be overlapped. Therefore, it can more easily achieve the narrow frame design of the LCD panel.

The present invention also provides a manufacturing method for an LCD device including the above manufacturing method for the LCD panel.

Figure 10:
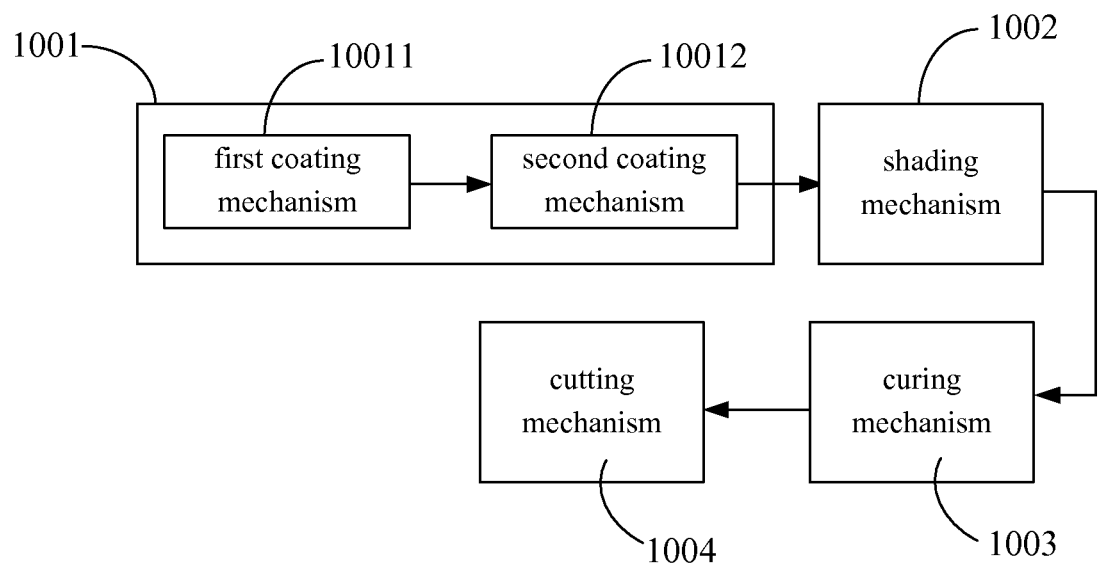
FIG. 10 is a block diagram of the manufacturing equipment for the LCD panel of the present invention.

With reference to FIG. 10 and FIG. 4, an embodiment of the manufacturing equipment for the LCD panel of the present invention includes:

A sealant coating mechanism 1001 is for coating the first sealant 2012 having electrical conductibility on the upper substrate 202 or the lower substrate 201 of the LCD panel, and coating the second sealant 2013 on the upper substrate 202 or the lower substrate 201 such that the upper and lower substrate adhere together to form the assembled panel 203 through the second sealant 2013 and the PSVA testing pad of the lower substrate 201 electrically connects to the transparent electrode 2021 of the upper substrate 202 through the first sealant 2012.

A shading mechanism 1002 is used for blocking the area surrounded by the second sealant 2013 of the assembled panel 203 at one side of the upper substrate 202 or the lower substrate 201 so as to prevent irradiating the area surrounded by the second sealant 2013 by the UV ray.

A curing mechanism 1003 is used for exposing the second sealant 2013 of the assembled panel 203 to cure the second sealant 2013.

Wherein, the sealant coating mechanism 1001 further includes a first coating mechanism 10011 for coating the first sealant 2012 having electrical conductibility on the PSVA testing pad 2011 of the lower substrate 201 or coating the first sealant 2012 having electrical conductibility on the position of the upper substrate 202 corresponding to the PSVA testing pad 2011 of the lower substrate 201 (not shown in FIG. 4) such that the PSVA testing pad of the lower substrate 201 electrically connects to the transparent electrode 2021 of the upper substrate 202 through the first sealant 2012 in assembly process.

A second coating mechanism 10012 is used for coating the second sealant 2013 on the edge of the upper substrate 202 or the lower substrate 201 to adhere the upper substrate 201 and lower substrate 202 through the second sealant 2013 to form the assembled panel 203, and the second sealant 2013 is located at the inner region of the first sealant 2012.

Wherein, the manufacturing equipment for the LCD panel of the present invention further includes a cutting mechanism 1004 for removing the part of the upper substrate 202 corresponding to the PSVA testing pad 2011 of the lower substrate 201 and also the first sealant 2012 to reveal the PSVA testing pad 2011 of the lower substrate 201.

In this embodiment, the sealant coating mechanism 1001 coats the first sealant 2012 having electrical conductivity on the upper substrate 202 or the lower substrate 201 such that the PSVA testing pad 2011 of the lower substrate 201 electrically connects to the transparent electrode 2021 of the upper substrate 202 through the first sealant 2012. Therefore, the lower substrate 201 and the upper substrate 202 have equal voltage in the UV curing process, that is, no voltage difference so that the liquid crystal molecules at the boundary of the active viewing area have the same pretilt state as the most of the liquid crystal molecules at the active viewing area after UV curing process for the sealant and before PSVA process. Therefore, the LCD panel of the present invention improves the uneven phenomenon around the screen of the active viewing area of LCD panel and reduces the occurrence of broken bright spot and is easier to realize narrow frame design of the LCD panel.

The above embodiments of the present invention are not used to limit the claims of this invention. Any use of the content in the specification or in the drawings of the present invention which produces equivalent structures or equivalent processes, or directly or indirectly used in other related technical fields is still covered by the claims in the present invention.

What is claimed is:

1. A manufacturing method for an LCD panel comprising:
    coating a first sealant having electrical conductivity on a PSVA (Polymer Stabilization Vertical Alignment) testing pad of a lower substrate of the LCD panel, or coating a first sealant having electrical conductivity on a position of an upper substrate of the LCD panel corresponding to a PSVA testing pad of the lower substrate, and adhering the upper and the lower substrate through a second sealant to form an assembled panel such that the PSVA testing pad electrically connects to a transparent electrode of the upper substrate through the first sealant, and the second sealant is located at the inner region of the first sealant;
    blocking the area surrounded by the second sealant of the assembled panel at one side of the upper substrate or the lower substrate, and exposing the assembled panel to cure the second sealant; and
    removing the part of the upper substrate corresponding to the PSVA testing pad of the lower substrate and also the first sealant to reveal the PSVA testing pad of the lower substrate.

2. The method according to claim 1, wherein, the step of coating the first sealant having electrical conductibility is specifically coating the first sealant having electric conductive particles.

3. The method according to claim 1, wherein, the step of coating the first sealant having electrical conductibility is specifically coating the first sealant having a non-curing property.

4. The method according to claim 1, wherein, the step of coating the first sealant having electrical conductibility is specifically coating the first sealant having electrical conductibility and a smaller first adhesion force, wherein, the second sealant has a second adhesion force, and the first adhesive force is smaller than the second adhesive force.

5. A manufacturing method for an LCD device, wherein, comprising a manufacturing method for an LCD panel, the manufacturing method for the LCD panel comprising:
    coating a first sealant having electrical conductibility on a PSVA testing pad of a lower substrate of the LCD panel, or coating a first sealant having electrical conductibility on a position of an upper substrate of the LCD panel corresponding to a PSVA testing pad of the lower substrate, and adhering the upper and the lower substrate through a second sealant to form an assembled panel such that the PSVA testing pad electrically connects to a transparent electrode of the upper substrate through the first sealant, and the second sealant is located at the inner region of the first sealant; and
    blocking the area surrounded by the second sealant of the assembled panel at one side of the upper substrate or the lower substrate, and exposing the assembled panel to cure the second sealant.

6. The method according to claim 5, wherein, the step of coating the first sealant having electrical conductibility is specifically coating the first sealant having electric conductive particles.

7. The method according to claim 5, wherein, the step of coating the first sealant having electrical conductibility is specifically coating the first sealant having a non-curing property.

8. The method according to claim 5, wherein, the step of coating the first sealant having electrical conductibility is specifically coating the first sealant having electrical conductibility and a smaller first adhesion force, wherein, the second sealant has a second adhesion force, and the first adhesive force is smaller than the second adhesive force.

9. The method according to claim 5, wherein, the step of exposing the assembled panel to cure the second sealant is specifically irradiating the assembled panel by UV ray to cure the second sealant.

* * * * *